US012157128B2

(12) United States Patent
Wang et al.

(10) Patent No.: US 12,157,128 B2
(45) Date of Patent: Dec. 3, 2024

(54) SHOWER HEAD

(71) Applicant: Xiamen Lota International Co., Ltd., Fujian (CN)

(72) Inventors: Xuedong Wang, Fujian (CN); Jinyong Chen, Fujian (CN); Xiaofei Guo, Fujian (CN); Chuanbao Zhu, Fujian (CN)

(73) Assignee: Xiamen Lota International Co., Ltd., Fujian (CN)

( * ) Notice: Subject to any disclaimer, the term of this patent is extended or adjusted under 35 U.S.C. 154(b) by 436 days.

(21) Appl. No.: 17/740,940

(22) Filed: May 10, 2022

(65) Prior Publication Data

US 2023/0285990 A1 Sep. 14, 2023

(30) Foreign Application Priority Data

Mar. 14, 2022 (CN) ........................ 202220549421.X

(51) Int. Cl.
*B05B 1/18* (2006.01)
*A47K 3/28* (2006.01)
*B05B 1/16* (2006.01)

(52) U.S. Cl.
CPC ................ *B05B 1/185* (2013.01); *A47K 3/28* (2013.01); *B05B 1/16* (2013.01)

(58) Field of Classification Search
CPC ....... B05B 1/16; B05B 1/1609; B05B 1/1618; B05B 1/1627; B05B 1/1636; B05B 1/1645; B05B 1/1654; B05B 1/1681; B05B 1/169; B05B 1/18; B05B 1/185; B05B 12/0026; A47K 3/28
See application file for complete search history.

(56) References Cited

U.S. PATENT DOCUMENTS

| | | | | |
|---|---|---|---|---|
| 8,113,442 | B2 * | 2/2012 | Li | B05B 1/1636 239/443 |
| 2016/0296952 | A1 * | 10/2016 | Lee | E03C 1/0408 |
| 2017/0120264 | A1 * | 5/2017 | Lin | B05B 15/65 |
| 2020/0086332 | A1 * | 3/2020 | Huang | B05B 1/1627 |
| 2020/0188940 | A1 * | 6/2020 | Lin | B05B 1/185 |
| 2021/0138488 | A1 * | 5/2021 | Lin | B05B 1/18 |
| 2022/0143630 | A1 * | 5/2022 | Hong | B05B 1/18 |
| 2022/0184643 | A1 * | 6/2022 | Zhadanov | B05B 1/18 |
| 2022/0241801 | A1 * | 8/2022 | Zhang | B05B 1/1618 |
| 2022/0250097 | A1 * | 8/2022 | Lin | B05B 1/1636 |
| 2022/0280955 | A1 * | 9/2022 | Lin | B05B 12/002 |

* cited by examiner

*Primary Examiner* — Darren W Gorman

(74) *Attorney, Agent, or Firm* — Cooper Legal Group, LLC

(57) ABSTRACT

A shower head comprises a body, a water outlet panel, and a switching member. The body comprises a valve cavity, a water inlet passage, a first water outlet passage, and a second water outlet passage, and each of the water inlet passage, the first water outlet passage, and the second water outlet passage is in communication with the valve cavity. The switching member comprises a valve rod portion and an elastic member. The water outlet panel is rotatably connected to the body and comprises a position-providing groove. When the position-providing groove is rotated to correspond to the valve rod portion, the valve rod portion is configured to be driven to be moved and switched to block the first water outlet passage, and the elastic member generates an elastic force.

9 Claims, 5 Drawing Sheets

SHOWER HEAD

RELATED APPLICATIONS

This application claims priority to Chinese patent application number 202220549421.X, filed on Mar. 14, 2022. Chinese patent application number 202220549421.X is incorporated herein by reference.

FIELD OF THE DISCLOSURE

The present disclosure relates to a shower head.

BACKGROUND OF THE DISCLOSURE

Existing shower heads comprise a housing, a water dividing body, and a water outlet panel. The water dividing body is disposed in the housing, and the water outlet panel is rotatably connected to the water dividing body. The water dividing body comprises a water inlet passage and water outlet passages connected to the water outlet panel. The water outlet panel comprises a plurality of water outlets. When the water outlet panel is rotated to a certain angle, the plurality of water outlets can be driven to be connected to the water outlet passages respectively to realize discharging water from different water outlets. In order to meet the needs of users, some other water outlets may be added to the existing shower heads to spray different water patterns, such as massage water, spray gun water, etc. Therefore, the water outlet panel is rotated or a button is directly connected to the water dividing body to realize switching of the water pattern. During use, the button is often pressed by mistake, causing the spray gun water be sprayed on electrical appliances, a top wall of a bathroom, or a human body so as to cause the electrical appliances to short-circuit.

BRIEF SUMMARY OF THE DISCLOSURE

The present disclosure provides a shower head to solve the deficiencies in the background.

In order to solve the technical problem, a technical solution of the present disclosure is as follows.

A shower head comprises a body, a water outlet panel, and a switching member. The body comprises a valve cavity, a water inlet passage, a first water outlet passage, and a second water outlet passage, and each of the water inlet passage, the first water outlet passage, and the second water outlet passage is in communication with the valve cavity. The switching member comprises a valve rod portion and an elastic member, and the valve rod portion is movably disposed in the valve cavity to be configured to alternatively block the first water outlet passage or the second water outlet passage. The elastic member is disposed between the body and the valve rod portion to drive the valve rod portion to block the second water outlet passage. The water outlet panel is rotatably connected to the body. The water outlet panel is configured to be rotated to be in communication with the first water outlet passage. The water outlet panel comprises a position-providing groove. When the position-providing groove is rotated to correspond to the valve rod portion, the valve rod portion is configured to be driven to be moved and switched to block the first water outlet passage, and the elastic member generates an elastic force.

In a preferred embodiment, when the position-providing groove is rotated to correspond to the valve rod portion, the position-providing groove is configured to correspondingly receive an end portion of the valve rod portion.

In a preferred embodiment, the water outlet panel comprises a position-limiting wall, and the position-limiting wall is connected to the position-providing groove. When the position-limiting wall corresponds to the valve rod portion, axial movement of the valve rod portion is inhibited by the position-limiting wall.

In a preferred embodiment, the position-limiting wall extends for a specified distance along a movement track of an end portion of the valve rod portion on the water outlet panel, and the position-providing groove is connected to one end of the position-limiting wall.

In a preferred embodiment, when the position-providing groove is rotated to correspond to the valve rod portion, an end portion of the valve rod portion is configured to move into the position-providing groove along an axial direction of the valve rod portion to be switched to block the first water outlet passage.

In a preferred embodiment, the body further comprises a water spray port located at a front end of the shower head, and the water spray port is connected to the second water outlet passage.

In a preferred embodiment, the water outlet panel comprises at least two water outlet ports, and the water outlet panel is rotated to enable one of the at least two water outlet ports to be in communication with the first water outlet passage.

In a preferred embodiment, the shower head further comprises a button. The button is connected to the valve rod portion and is configured to drive the valve rod portion to be switched to block the first water outlet passage.

In a preferred embodiment, the body comprises a water dividing body, and the water dividing body comprises the valve cavity, the water inlet passage, the first water outlet passage, and the second water outlet passage. The water outlet panel is rotatably connected to the water dividing body.

Compared with the existing techniques, the technical solution has the following advantages.

The shower head comprises the body, the water outlet panel, and the switching member. The body comprises the valve cavity, the water inlet passage, the first water outlet passage, and the second water outlet passage, and each of the water inlet passage, the first water outlet passage, and the second water outlet passage is in communication with the valve cavity. The switching member comprises the valve rod portion and the elastic member. The valve rod portion is movably disposed in the valve cavity to be configured to alternatively block the first water outlet passage or the second water outlet passage. The elastic member is disposed between the body and the valve rod portion to drive the valve rod portion to continue blocking the second water outlet passage. The water outlet panel is rotatably connected to the body, and the water outlet panel is configured to be rotated to be in communication with the first water outlet passage. The water outlet panel comprises a position-providing groove. When the position-providing groove is rotated to correspond to the valve rod portion, the valve rod portion is configured to be driven to be moved and switched to block the first water outlet passage and the elastic member generates an elastic force.

The shower head can only be driven and switched to block the first water outlet passage when the water outlet panel is rotated to make the position-providing groove correspond to the valve rod portion. When an external force is removed, the elastic force generated by the elastic member can drive the valve rod portion to return to an original position of the valve rod portion, which is safe and reliable to use.

DETAILED DESCRIPTION OF THE EMBODIMENTS

The present disclosure will be further described below in combination with the accompanying drawings and embodiments.

Figure 1:
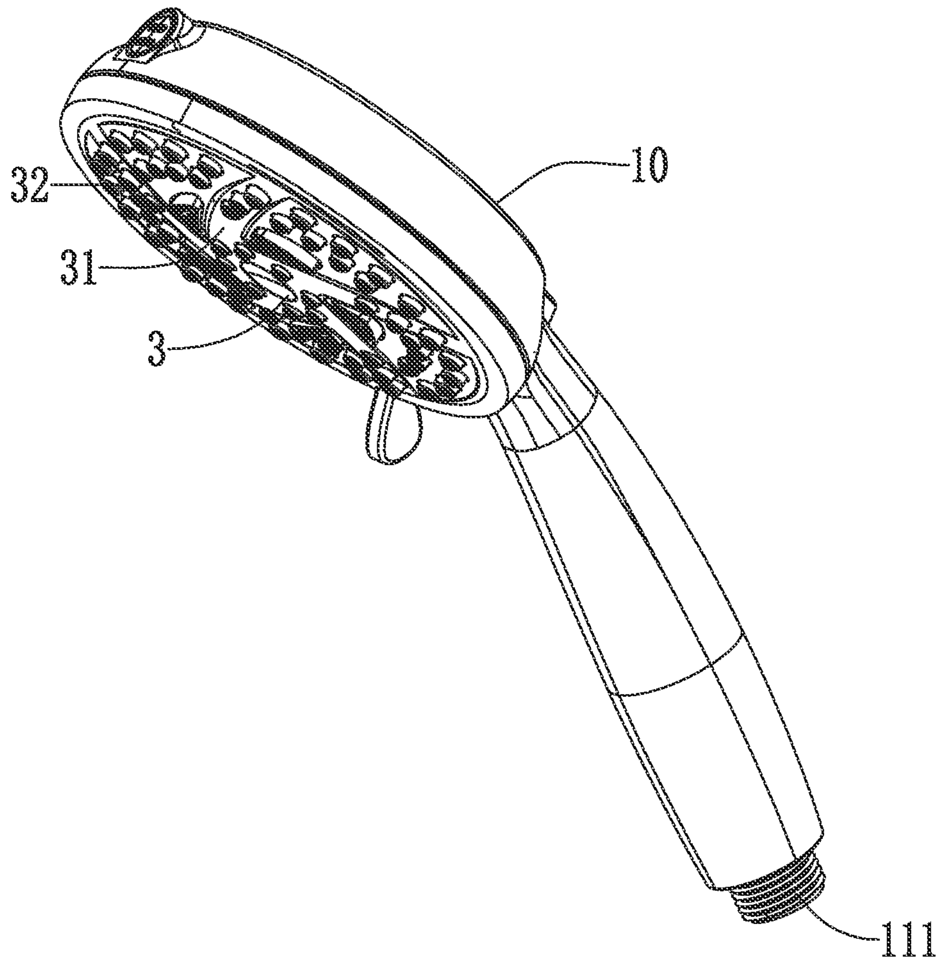
FIG. 1 illustrates a perspective view of a shower head of a preferred embodiment in the present disclosure.
Figure 2:
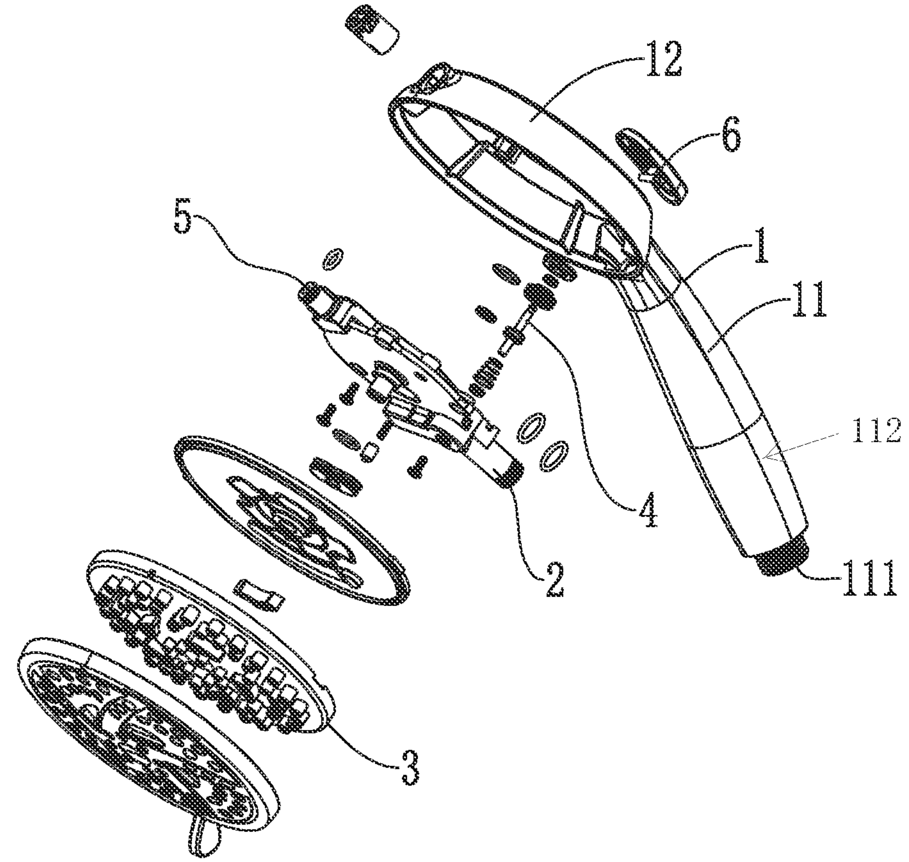
FIG. 2 illustrates an exploded perspective view of the shower head of a preferred embodiment in the present disclosure.
Figure 3:
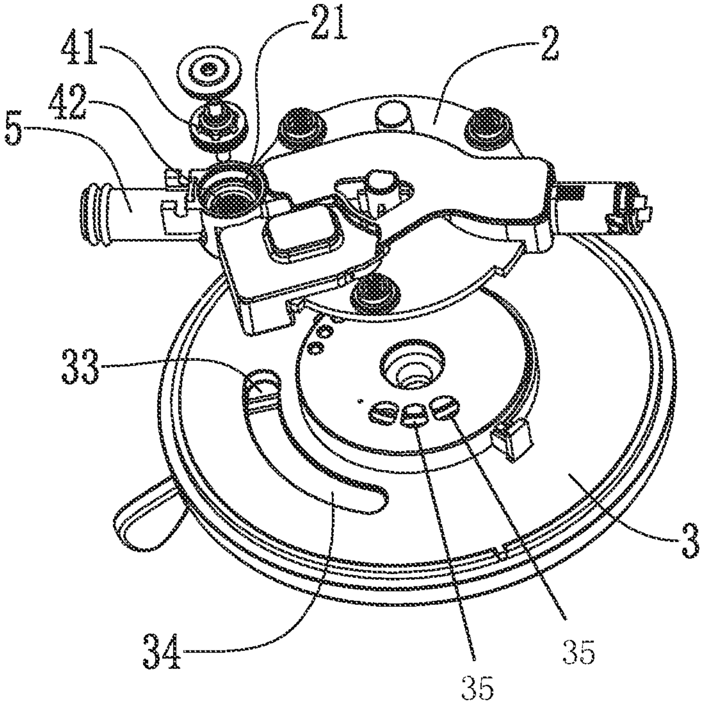
FIG. 3 illustrates a first exploded perspective view of a water dividing body of a preferred embodiment in the present disclosure.
Figure 4:
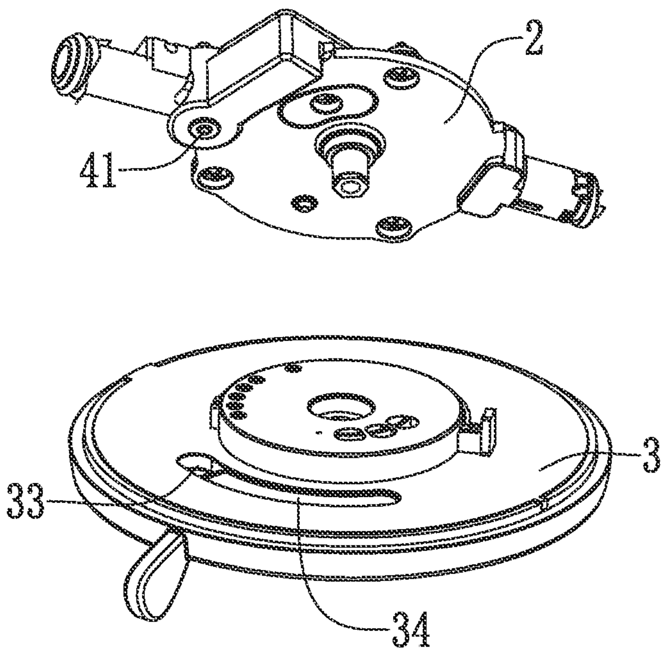
FIG. 4 illustrates a second exploded perspective view of the water dividing body of a preferred embodiment in the present disclosure.
Figure 5:
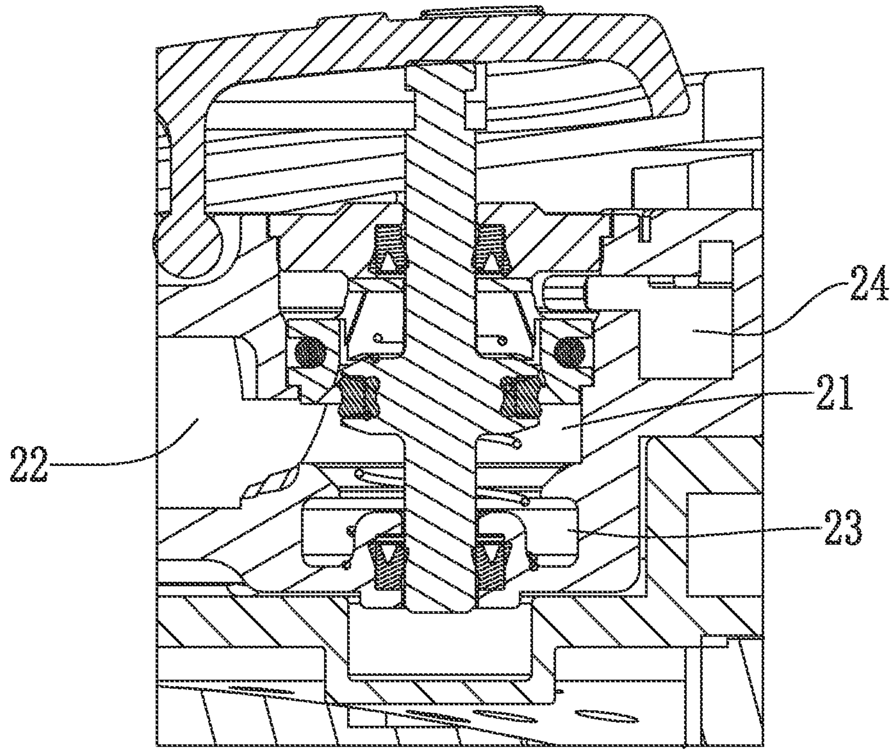
FIG. 5 illustrates a partial cross-sectional view of the shower head of a preferred embodiment in the present disclosure.

Referring to FIGS. 1-5, a shower head comprises a body 10. The body 10 comprises a housing 1 and a water dividing body 2, and the housing 1 comprises a handheld portion 11 and a water outlet portion 12 connected to the handheld portion 11. The handheld portion 11 is elongated, the water outlet portion 12 is disc-shaped, and the water dividing body 2 is disposed in the housing 1. A distal end of the handheld portion 11 defines a water inlet connector 111, and the handheld portion 11 comprises a water passage 112 connected to the water inlet connector 111. The water dividing body 2 comprises a valve cavity 21, a water inlet passage 22, a first water outlet passage 23, and a second water outlet passage 24, and each of the water inlet passage 22, the first water outlet passage 23, and the second water outlet passage 24 is connected to the valve cavity 21. The water inlet passage 22 of the water dividing body 2 is in communication with the water passage.

The shower head further comprises a water outlet panel 3, and the water outlet panel 3 is rotatably connected to the water dividing body 2 and located on the water outlet portion 12. The water outlet panel 3 comprises a water outlet surface 31 facing outwardly, and the water outlet panel 3 comprises at least two water outlet ports 32 located on the water outlet surface 31. The at least two water outlet ports 32 can respectively discharge different water patterns with different shapes. The water outlet panel 3 further comprises two water inlet ports 35, and the two water inlet ports 35 are respectively connected to the at least two water outlet ports 32. The water outlet panel 3 is configured to be rotated to drive the two water inlet ports 35 to be alternatively in communication with the first water outlet passage 23.

The shower head further comprises a switching member 4, and the switching member 4 comprises a valve rod portion 41 and an elastic member 42. The valve rod portion 41 is movably disposed in the valve cavity 21 to alternatively block the first water outlet passage 23 or the second water outlet passage 24. The elastic member 42 abuts between the body 10 and the valve rod portion 41 to drive the valve rod portion 41 to block the second water outlet passage 24. The water outlet panel 3 comprises a position-providing groove 33. When the position-providing groove 33 is rotated to correspond to the valve rod portion 41, the valve rod portion 41 is configured to be driven to be moved and switched to block the first water outlet passage 23, and the elastic member 42 generates an elastic force.

When the shower head discharges water normally, it is only necessary to rotate the water outlet panel 3 to switch the at least two water outlet ports 32 of the water outlet surface 31 to discharge water. When the water outlet panel 3 is rotated to enable the position-providing groove 33 to correspond to the valve rod portion 41, the valve rod portion 41 can be driven by a user to block the first water outlet passage 23, and the second water outlet passage 24 discharges water. The second water outlet passage 24 can be connected to a water spray port 5 located at a front end of the shower head to realize water output similar to a spray gun. The water spray port 5 corresponds to a high water pressure spray and can play an effect of scouring dirt.

In this embodiment, when the position-providing groove 33 is rotated to correspond to the valve rod portion 41, the position-providing groove 33 can correspondingly receive an end portion of the valve rod portion 41. The position-providing groove 33 extends for a certain distance along an axial direction of the valve rod portion 41. When the position-providing groove 33 is rotated to correspond to the valve rod portion 41, the end portion of the valve rod portion 41 can move into the position-providing groove 33 along the axial direction of the valve rod portion 41 to be switched to block the first water outlet passage 23.

In this embodiment, a face of the water outlet panel 3 facing the water dividing body 2 comprises a position-limiting wall 34, and the position-limiting wall 34 is connected to the position-providing groove 33. The position-limiting wall 34 inhibits axial movement of the valve rod portion 41 when corresponding to the valve rod portion 41. The position-limiting wall 34 extends for a certain distance along a movement track of the end portion of the valve rod portion 41 on the water outlet panel 3. The position-providing groove 33 is connected to one end of the position-limiting wall 34. Therefore, an extending track of the position-limiting wall 34 is arc-shaped, and the position-providing groove 33 is located at one end of the arc-shaped position-limiting wall 34.

In this embodiment, the shower head further comprises a button 6 connected to the valve rod portion 41 to be configured to drive the valve rod portion 41 to be switched to block the first water outlet passage 23.

During use, the user can drive the water outlet panel 3 to rotate. When the valve rod portion 41 does not correspond to the position-providing groove 33, rotation of the water outlet panel 3 can enable the two water inlet ports to alternatively correspond to the first water outlet passage 23 to achieve discharging water of the water outlet panel 3. When the water outlet panel 3 is rotated to make the valve rod portion 41 correspond to the position-providing groove 33, the user can press the button 6 to switch the valve rod portion 41 to block the first water outlet passage 23. At this time, the second water outlet passage 24 discharges water through the water spray port 5.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A shower head, comprising:

a body, a water outlet panel, and a switching member, wherein:

the body comprises a valve cavity, a water inlet passage, a first water outlet passage, and a second water outlet passage, each of the water inlet passage, the first water outlet passage, and the second water outlet passage is in communication with the valve cavity, the switching member comprises a valve rod portion and an elastic member, the valve rod portion is movably disposed in the valve cavity to be configured to alternatively block the first water outlet passage or the second water outlet passage, the elastic member is disposed between the body and the valve rod portion to drive the valve rod portion to block the second water outlet passage, the water outlet panel is rotatably connected to the body, the water outlet panel is configured to be rotated to be in communication with the first water outlet passage, the water outlet panel comprises a position-providing groove, and when the position-providing groove is rotated to correspond to the valve rod portion:

the valve rod portion is configured to be driven to be moved and switched to block the first water outlet passage, and the elastic member generates an elastic force.

2. The shower head according to claim 1, wherein:

when the position-providing groove is rotated to correspond to the valve rod portion, the position-providing groove is configured to correspondingly receive an end portion of the valve rod portion.

3. The shower head according to claim 1, wherein:

the water outlet panel comprises a position-limiting wall, the position-limiting wall is connected to the position-providing groove, and when the position-limiting wall corresponds to the valve rod portion, axial movement of the valve rod portion is inhibited by the position-limiting wall.

4. The shower head according to claim 3, wherein:

the position-limiting wall extends for a specified distance along a movement track of an end portion of the valve rod portion on the water outlet panel, and the position-providing groove is connected to one end of the position-limiting wall.

5. The shower head according to claim 3, wherein:

when the position-providing groove is rotated to correspond to the valve rod portion, an end portion of the valve rod portion is configured to move into the position-providing groove along an axial direction of the valve rod portion to be switched to block the first water outlet passage.

6. The shower head according to claim 1, wherein:

the body further comprises a water spray port located at a front end of the shower head, and the water spray port is connected to the second water outlet passage.

7. The shower head of claim 1, wherein:

the water outlet panel comprises at least two water outlet ports, and the water outlet panel is rotated to enable one of the at least two water outlet ports to be in communication with the first water outlet passage.

8. The shower head according to claim 1, further comprising:

a button, wherein:

the button is connected to the valve rod portion and is configured to drive the valve rod portion to be switched to block the first water outlet passage.

9. The shower head according to claim 1, wherein:

the body comprises a water dividing body, the water dividing body comprises the valve cavity, the water inlet passage, the first water outlet passage, and the second water outlet passage, and the water outlet panel is rotatably connected to the water dividing body.

* * * * *